US010902087B2

United States Patent
Aga et al.

(10) Patent No.: US 10,902,087 B2
(45) Date of Patent: Jan. 26, 2021

(54) DEVICE AND METHOD FOR ACCELERATING MATRIX MULTIPLY OPERATIONS AS A SUM OF OUTER PRODUCTS

(71) Applicant: Advanced Micro Devices, Inc., Santa Clara, CA (US)

(72) Inventors: Shaizeen Aga, Santa Clara, CA (US); Nuwan Jayasena, Santa Clara, CA (US); Allen H. Rush, Santa Clara, CA (US); Michael Ignatowski, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 38 days.

(21) Appl. No.: 16/176,678

(22) Filed: Oct. 31, 2018

(65) Prior Publication Data
US 2020/0133993 A1 Apr. 30, 2020

(51) Int. Cl.
*G06F 17/16* (2006.01)
*G06F 15/80* (2006.01)
*G06F 7/53* (2006.01)

(52) U.S. Cl.
CPC ............ *G06F 17/16* (2013.01); *G06F 7/5306* (2013.01); *G06F 7/5318* (2013.01); *G06F 7/5324* (2013.01); *G06F 15/8007* (2013.01)

(58) Field of Classification Search
None
See application file for complete search history.

(56) References Cited

U.S. PATENT DOCUMENTS

| 5,099,447 A  * |  3/1992 | Myszewski ............. G06F 17/16 708/607 |
| 7,028,168 B2 * |  4/2006 | Wadleigh ............ G06F 9/30036 712/221 |
| 8,321,422 B1 * | 11/2012 | Kwatra ................... G06F 17/18 707/743 |

(Continued)

OTHER PUBLICATIONS

Cannon, L., "A cellular computer to implement the kalman filter algorithm", Doctoral Dissertation, Montana State University, Bozeman, MT. USA, 229 pgs., 1969.

(Continued)

*Primary Examiner* — Michael D. Yaary
(74) *Attorney, Agent, or Firm* — Volpe Koenig

(57) ABSTRACT

A processing device is provided which includes memory and a processor comprising a plurality of processor cores in communication with each other via first and second hierarchical communication links. Each processor core in a group of the processor cores is in communication with each other via the first hierarchical communication links. Each processor core is configured to store, in the memory, one of a plurality of sub-portions of data of a first matrix, store, in the memory, one of a plurality of sub-portions of data of a second matrix, determine an outer product of the sub-portion of data of the first matrix and the sub-portion of data of the second matrix, receive, from another processor core of the group of processor cores, another sub-portion of data of the second matrix and determine another outer product of the sub-portion of data of the first matrix and the other sub-portion of data of the second matrix.

19 Claims, 7 Drawing Sheets

(56) References Cited

U.S. PATENT DOCUMENTS

2010/0318758 A1* 12/2010 Agrawal .............. G06F 17/16
                                                        711/170
2011/0055517 A1*  3/2011 Eichenberger ...... G06F 9/30036
                                                          712/7

OTHER PUBLICATIONS

Fox, G. C. et al., "Matrix algorithms on a hypercube i: Matrix multiplication," Parallel Computing, vol. 4, pp. 17-31, Elsevier Science Publishers B.V., Feb. 1987.
Van De Geijn, R. et al., "Summa: Scalable Universal Matrix Multiplication Algorithm" Technical Report, University of Texas at Austin, Austin, TX, USA, 19 pgs., 1995.

* cited by examiner

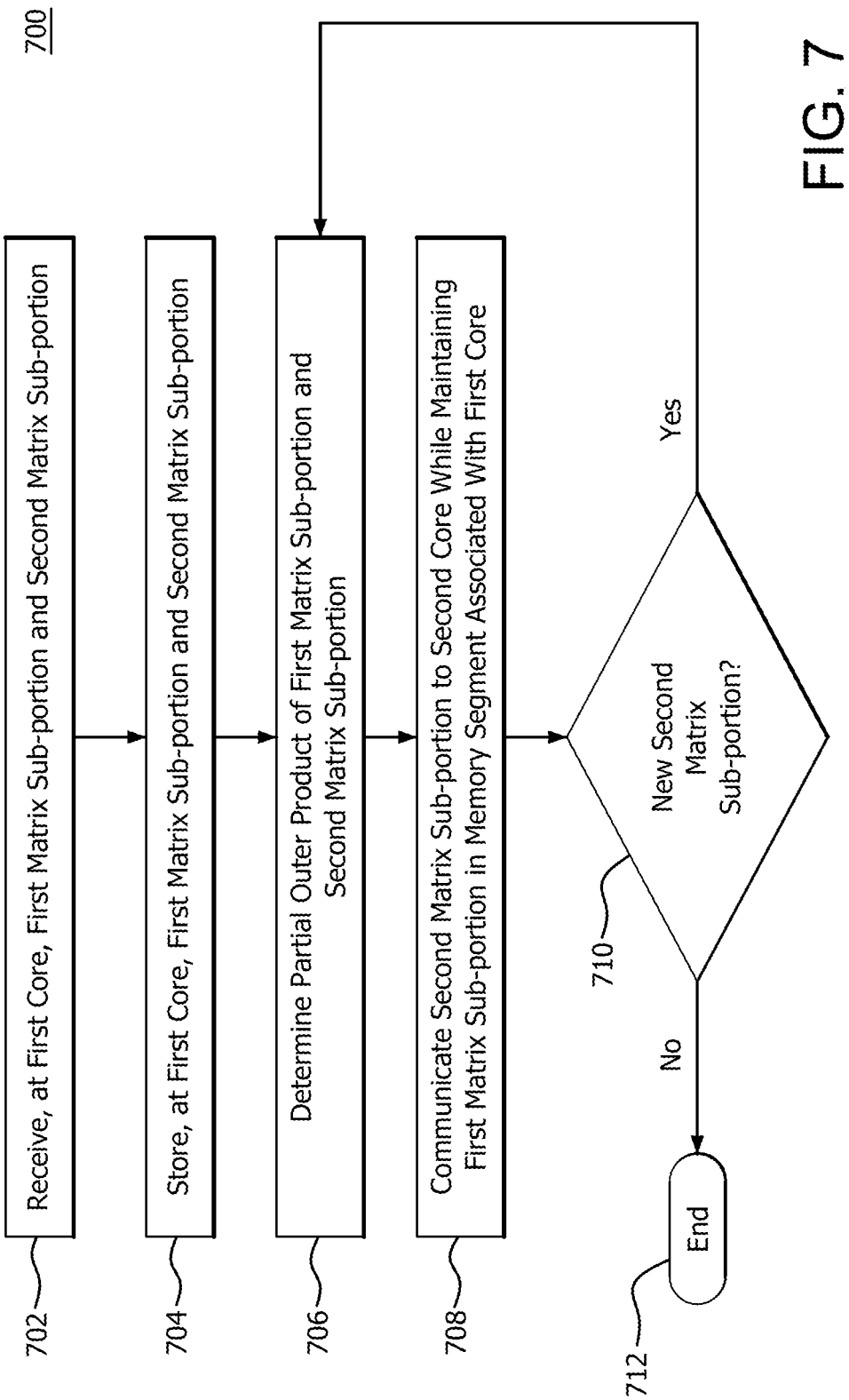

DEVICE AND METHOD FOR ACCELERATING MATRIX MULTIPLY OPERATIONS AS A SUM OF OUTER PRODUCTS

BACKGROUND

Matrix multiplication is a key building block across a number of application domains, including use in high performance computing (HPC) and machine learning. Matrix multiplication is also used in convolutional neural networks, recurrent neural networks and other forms of artificial neural networks.

Conventional matrix multiplication techniques employ parallelization to increase the efficiency of matrix multiplication. For example, two matrices are typically divided into smaller portions (e.g., columns, rows, and portions of columns and rows) and a matrix multiplication operation of the two matrices is performed by executing a plurality of matrix multiplication computations each including the multiplication of a portion of one matrix with a portion of another matrix. The matrix multiplication computations are mapped to and executed by different processor cores of a processor network to perform the matrix multiplication operation.

BRIEF DESCRIPTION OF THE DRAWINGS

A more detailed understanding can be had from the following description, given by way of example in conjunction with the accompanying drawings wherein:

FIG. 7 is a flow diagram illustrating an example matrix multiplication method as a sum of partial outer products according to features of the disclosure.

DETAILED DESCRIPTION

Figure 1:
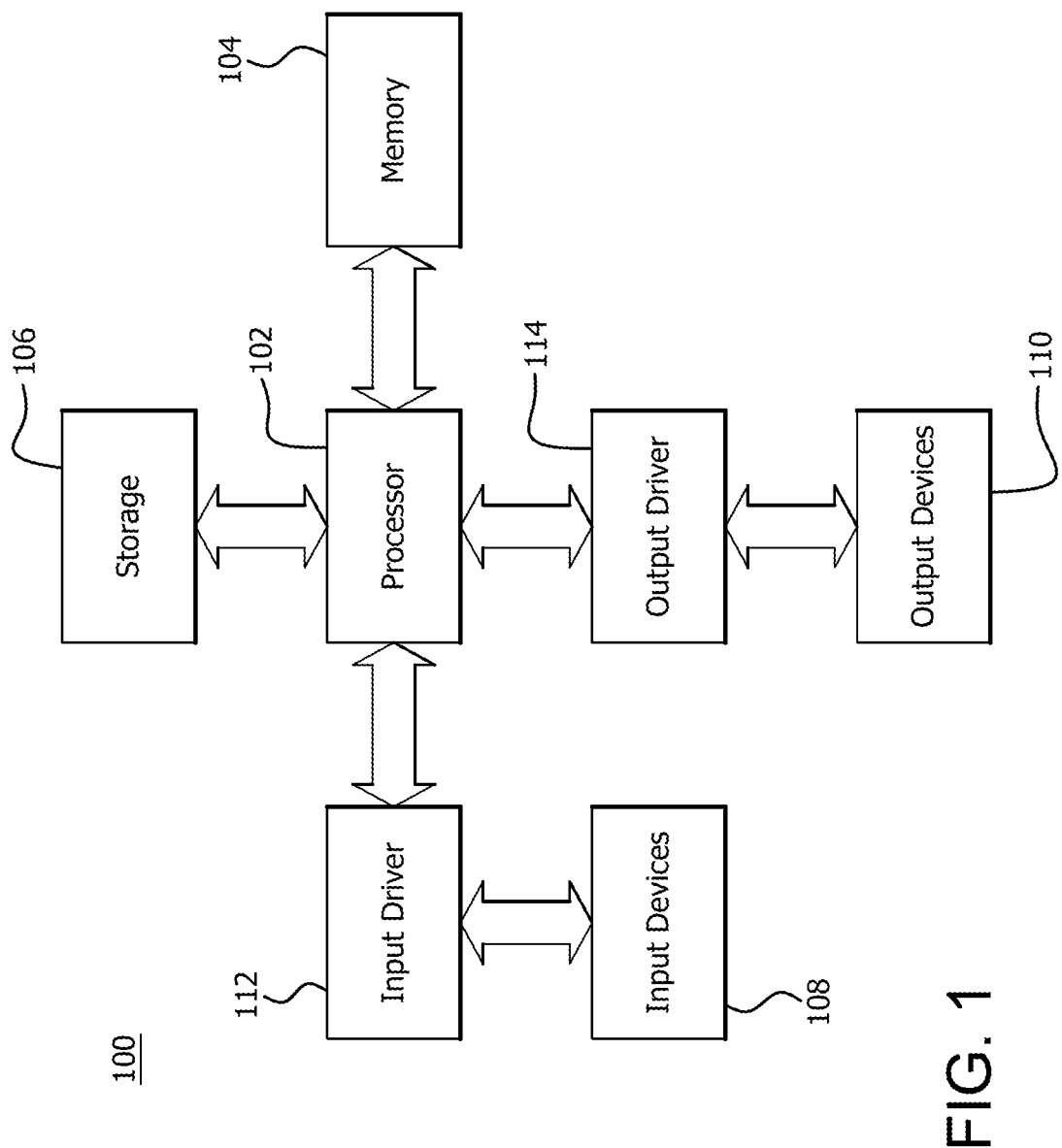
FIG. 1 is a block diagram of an example device in which one or more features of the disclosure can be implemented.

As used herein, programs include sequences of instructions to be executed using one or more processors to perform procedures or routines (e.g., operations, computations, functions, processes, jobs). Processing of programmed instructions and data includes one or more of a plurality of processing stages, such as but not limited to fetching, decoding, scheduling for execution, executing and decoding the programmed instructions and data. Programmed instructions include, for example, applications and control programs, such as operating systems.

Processors include, for example, multiple processing cores (e.g., compute units (CUs)) each of which are configured to read and execute program instructions, such as instructions to perform matrix multiplications.

For simplification purposes, "store" is used herein to refer to loading data, which is received (e.g., read) from main memory, into registers or other available local storage as well as writing data from registers or other available local storage to main memory. "Communicate" is used herein to refer to sending data between CUs without main memory accesses (e.g., storing data from registers or local storage of one processor to registers or local storage of another processor).

Conventional techniques used to perform matrix multiplications are ill-suited for hierarchical networks (e.g., CU networks). For example, conventional matrix multiplication techniques exhibit load imbalance, causing some CUs to stall other CUs in the hierarchical network. In addition, these conventional techniques inefficiently use the underlying hierarchical CU networks to perform matrix multiplication operations.

The present application provides apparatuses and methods of mapping matrix multiplication computations, as a sum of partial outer products, to a hierarchical CU network. The apparatuses and methods described herein exploit characteristics of the hierarchical CU networks, such as physical proximity between CUs in CU groups of the networks and asymmetric communication links in the networks, to execute matrix multiplications more efficiently than conventional matrix multiplication techniques, resulting in a decreased load imbalance among CUs in the hierarchical network and a reduced amount of data communicated between CUs in the hierarchical network. Features of the present disclosure localize communication using links between CUs which are physically closer to each other than other CUs in the hierarchical network. These communication links are, for example, configured to be physically wider and transmit data faster between the more closely located CUs than other communication links between CUs which are more distant from each other.

A processing device is provided which includes memory configured to store data and a processor comprising a plurality of processor cores in communication with each other via first and second hierarchical communication links. Each processor core in a group of the processor cores is in communication with each other via the first hierarchical communication links. Each processor core is configured to store, in the memory, one of a plurality of sub-portions of data of a first matrix and store, in the memory, one of a plurality of sub-portions of data of a second matrix. Each processor core is also configured to determine an outer product of the sub-portion of data of the first matrix and the sub-portion of data of the second matrix and receive, from another processor core of the group of processor cores, another sub-portion of data of the second matrix. Each processor core is further configured to determine another outer product of the sub-portion of data of the first matrix and the other sub-portion of data of the second matrix.

A processing device is provided which comprises memory configured to store data and a first plurality of processor cores in communication with each other via first hierarchical communication links. The first plurality of processor cores comprises a first processor core and a second processor core. The first processor core is configured to determine an outer product of a first sub-portion of data of a first matrix stored in a memory segment associated with the first processor core and a first sub-portion of data of a second matrix stored in the memory segment associated with the first processor core and communicate, to the second processor core, via one of the first hierarchical communication links, the first sub-portion of data of the second matrix without communicating the first sub-portion of data of the first matrix to the second processor core. The second processor core is configured to receive the first sub-portion of data of the second matrix communicated by the first processor core without accessing the memory and determine another outer product of the first sub-portion of data of the second matrix received from the first processor core and a second sub-portion of data of the first matrix received from memory.

A method for use in a processing device having a plurality of processor cores for performing matrix multiplication as a sum of partial outer products is provided. The method comprises receiving, from memory by a first processor core, a first sub-portion of data of a first matrix and receiving, from the memory by the first processor core, a first sub-portion of data of a second matrix. The method also comprises determining, by the first processor core, an outer product of the first sub-portion of data of the first matrix and the first sub-portion of data of the second matrix and communicating, by the first processor core to a second processor core, the first sub-portion of data of the second matrix via one of a plurality of first hierarchical communication links. The method further comprises receiving, from the memory by the second processor core, a second sub-portion of data of the first matrix and determining, by the second processor core, another outer product of the second sub-portion of data of the first matrix and the first sub-portion of data of the second matrix.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), including dynamic RAM (DRAM) and static RAM (SRAM). The RAM includes for example, cache memory, scratchpad memory and registers.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Features of the present disclosure are described herein using CUs as an example of processor cores. CUs include one or more single instruction, multiple data (SIMD) units that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit includes sixteen lanes, where each lane executes the same instruction at the same time as the other lanes in a SIMD unit but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. The parallelism afforded by CUs is suitable for matrix multiplication, such as for example, matrix multiplication used in graphics related operations such as pixel value calculations, vertex transformations, and other graphics operations.

Figure 2:
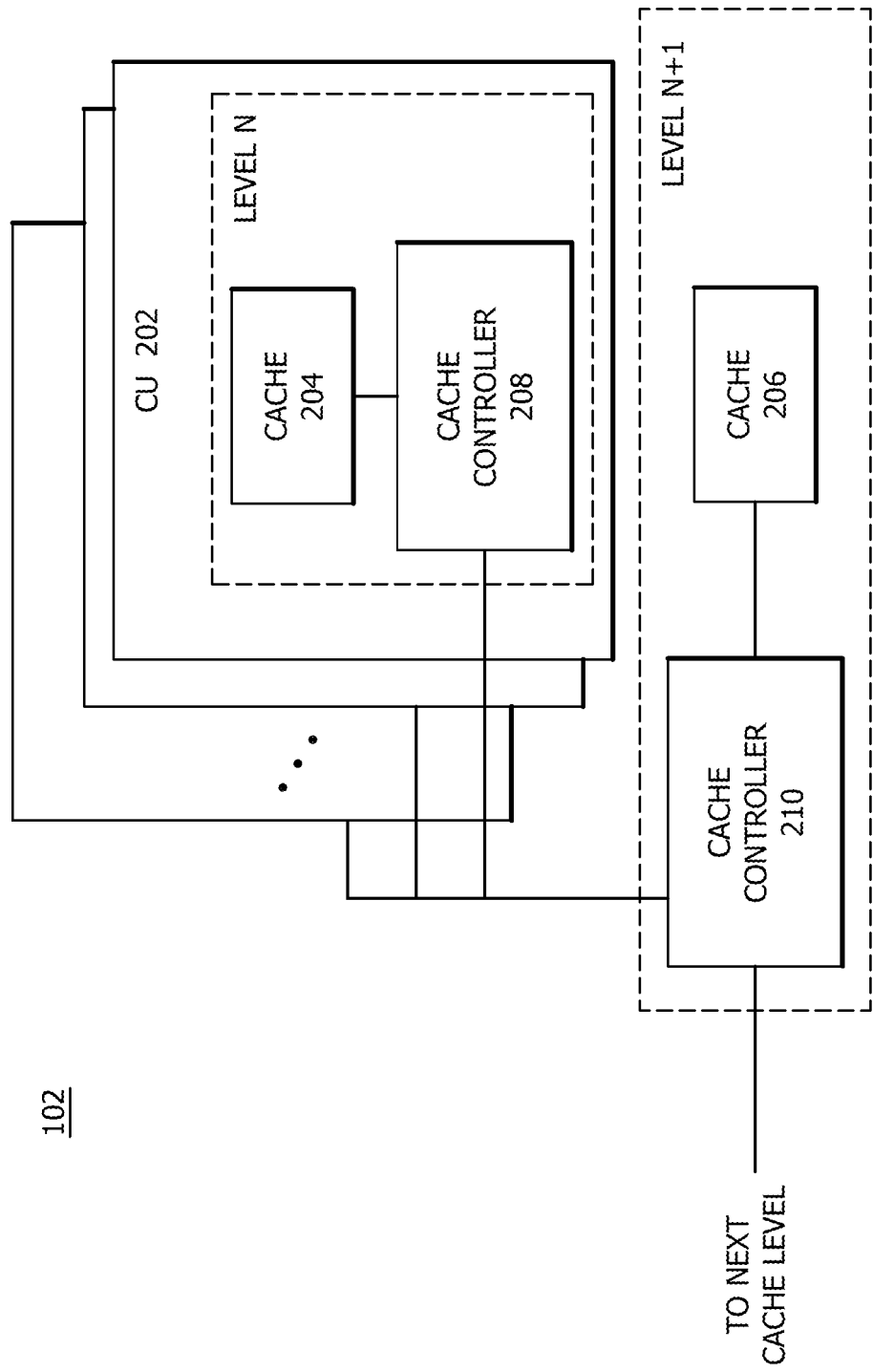
FIG. 2 is a block diagram illustrating exemplary components of a processor in which one or more features of the disclosure can be implemented.

FIG. 2 is a block diagram illustrating an example of processor 102 shown in FIG. 1 in which one or more features of the disclosure can be implemented. As shown in FIG. 2, processor 102 includes a plurality of CUs 202. Each CU 202 includes a level N (e.g., level 1) cache controller 208 in communication with a corresponding level N cache 204 and is configured to process data using the corresponding level N cache 204. Alternatively, a plurality of level N cache controllers 208 (e.g., a cache controller 208 for each CU 202 or a plurality of cache controllers 208 each in communication with a group of CUs 202) is used to process data.

As shown in FIG. 2, processor 102 also includes a level N+1 (e.g., level 2) cache controller 210 in communication with level N+1 cache 206 and is configured to process data using a level N+1 cache 206. Alternatively, a plurality of level N+1 cache controllers, in communication with one or more corresponding level N+1 caches, is used to process data. As shown in FIG. 2, cache controller 210 is also in communication with a next cache level (e.g., level 3) and each level N cache controller 208. Additionally or alternatively, each CU 202 is in communication with different types of memory 104, such as registers and scratchpad memory.

Matrix multiplication includes mapping elements of matrices (i.e., data in rows and columns of the matrices) to a network of communicating CUs. Some matrices (e.g., machine learning matrices) often result in being memory (e.g., cache memory) bound. In addition, bottlenecks often occur during matrix multiplication (e.g., machine learning matrix multiplication) when small matrices (i.e., small number of elements) or irregular matrices (e.g., uneven number of rows and columns) result in an insufficient amount of work per CU 302.

Figure 3:
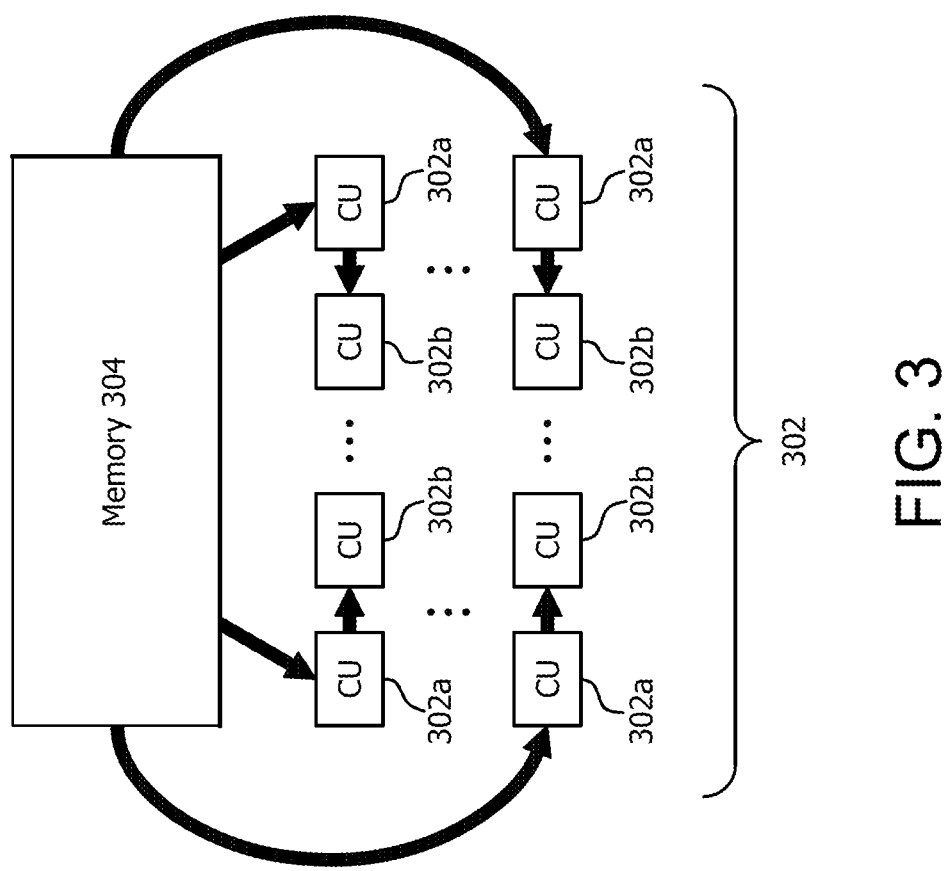
FIG. 3 is a block diagram illustrating a network of CUs which includes CUs which received data from memory and other CUs which receive data from other CUs in the network.

FIG. 3 is a block diagram illustrating a CU network including CUs 302a which receive data from memory 304 and other CUs 302b which receive data from CUs 302a. That is, data initially received (e.g., read from memory) by CUs 302a can be communicated to CUs 302b in the next phase of a matrix multiplication computation. Using CUs (e.g., CUs 302b) to receive data via other CUs (e.g., CUs 302a) instead of receiving data directly from memory 304, as shown in the example at FIG. 3, relieves pressure on memory bandwidth.

Hierarchical CU networks employ the technique illustrated in FIG. 3. Some conventional matrix multiplication techniques which employ this technique however, exhibit load imbalance, causing some CUs to stall other CUs in the hierarchical network. In addition, these conventional techniques inefficiently use the underlying hierarchical CU networks to perform matrix multiplication operations.

Features of the present disclosure exploit characteristics of hierarchical CU networks, such as physical proximity between subsets of CUs in the hierarchical networks and asymmetric communication links in the networks, to perform matrix multiplications more efficiently than conventional matrix multiplication techniques. As described in more detail below, communication is localized to communication links between CUs which are physically closer to each other than other CUs. These communication links are, for example, configured to be physically wider and transmit data faster between the more closely located CUs than other communication links between CUs which are more distant from each other.

Figure 4:
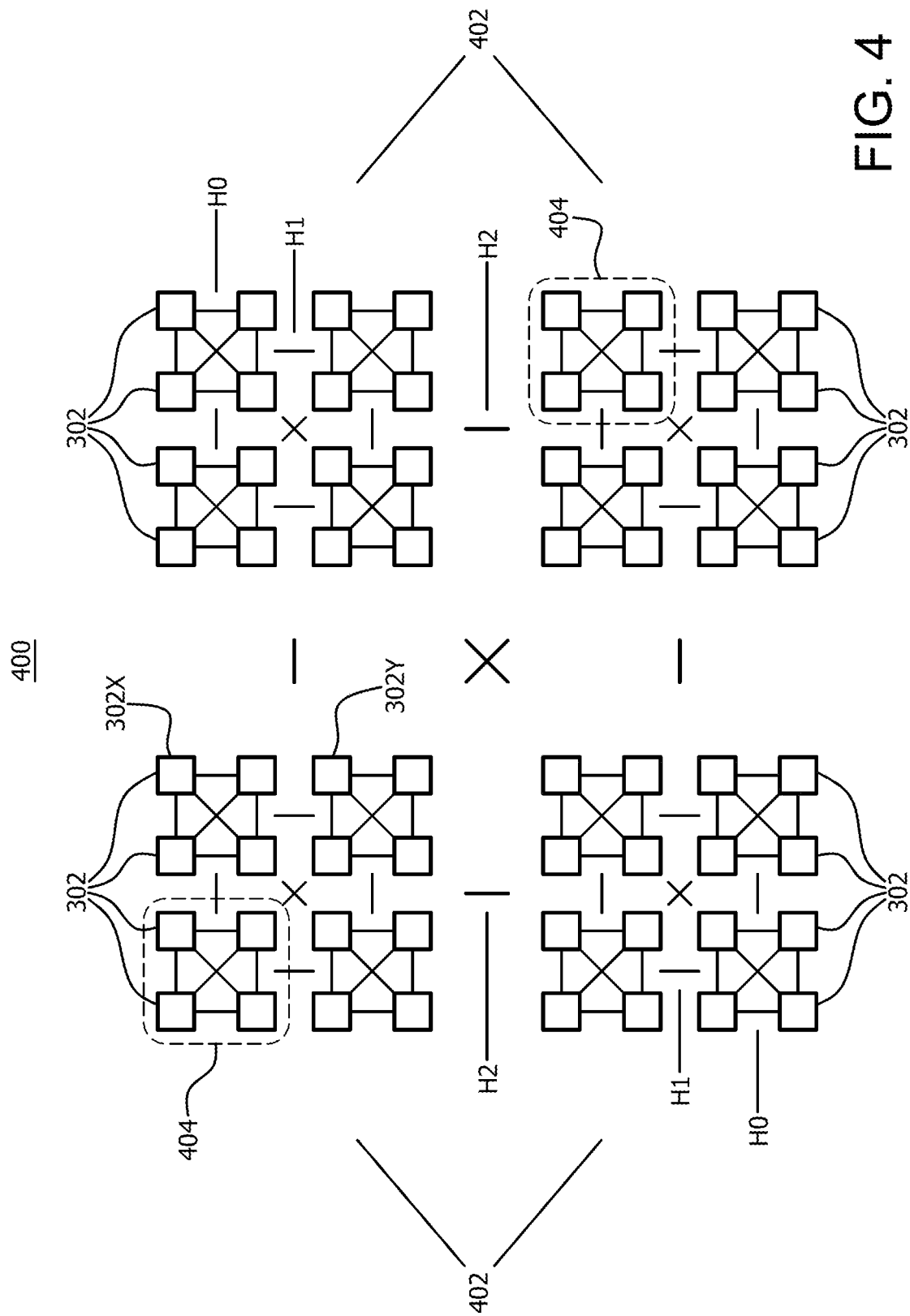
FIG. 4 is a diagram illustrating an example hierarchical network in which one or more features of the disclosure can be implemented.

FIG. 4 is a diagram illustrating an example hierarchical network 400 in which one or more features of the disclosure can be implemented. The network 400 includes 64 CUs 302 and three hierarchical levels each defined by different communication links H0, H1, and H2. As shown in FIG. 4, the network 400 includes 4 super CU clusters 402. Each super CU cluster 402 includes 4 super CUs 404. Each super CU 404 includes 4 CUs 302. Each CU 302 in a super CU 404 has a correspondingly located CU 302 in another super CU 404. For example, as shown in FIG. 4, CU 302X, which is located at row 1, column 2 of its super CU 404 includes a corresponding located CU 302Y, located at row 1, column 2 of its super CU 404. Likewise, the two remaining super CUs 404 in the super CU cluster 402 also have corresponding located CUs at row 1, column 2 of their super CUs 404.

Each super CU 404 includes communication links H0 (e.g., up, down, left, right and diagonal) for communicating data between CUs 302 of the super CU 404. Accordingly, CUs 302 within a super CU 404 communicate with each other on a first hierarchical level via communication links H0. Each super CU cluster 402 includes communication links H1 (e.g., up, down, left, right and diagonal) for communicating data between super CUs 404 of the super CU cluster 402. Accordingly, CUs 302 within one super CU 404 of a super CU cluster 402 communicate with CUs 302 within another super CU 404 of the super CU cluster 402 on a second hierarchical level via communication links H1. The network 400 also includes communication links H2 (e.g., up, down, left, right and diagonal) for communicating data between super CU cluster 402 of the network 400. Accordingly, CUs 302 within one super CU cluster 402 communicate with CUs 302 within another super CU cluster 402 on a third hierarchical level via communication links H2. The numbers of CUs, super CUs, super CU clusters and hierarchies shown in FIG. 4 are merely exemplary.

Because CUs 302 within a super CU 404 are closer, in physical proximity, to each other than CUs 302 of neighboring super CUs 404 and CUs 302 of neighboring super CU clusters 402, it is more efficient to communicate data between the CUs 302 within a super CU 404 at the first hierarchical level via communication links H0 than communicating data between the CUs 302 at the second hierarchical level via communication links H1 and the third hierarchical level via communication links H2.

For example, data is communicated between the CUs 302 within a super CU 404 at the first hierarchical level via communication links H0 in less time (e.g., less latency) than data is communicated between the CUs 302 at the second hierarchical level via communication links H1 and the third hierarchical level via communication links H2. In addition, increasing the physical size (e.g., width, or diameter cross section) of a link increases the bandwidth (i.e., amount of data transmitted in an amount of time) over the link, thereby decreasing the probability of a bottleneck occurring. Increasing the physical size of a link, however, also increases the amount of material of the link, thereby increasing the overall cost (e.g., cost of material, manufacturing cost) of the processing device. Because the lengths of the communication links H0 are less than the lengths of the communication links H1 and H2, it costs less to increase the widths along the lengths of links H0 than the width along the longer lengths of links H1 and H2. Therefore, it is more efficient to increase the widths of links H0 (i.e., increase the H0 bandwidth) relative to links H1 and links H2 and communicate more data over the H0 links (i.e., localize communication).

Figure 5:
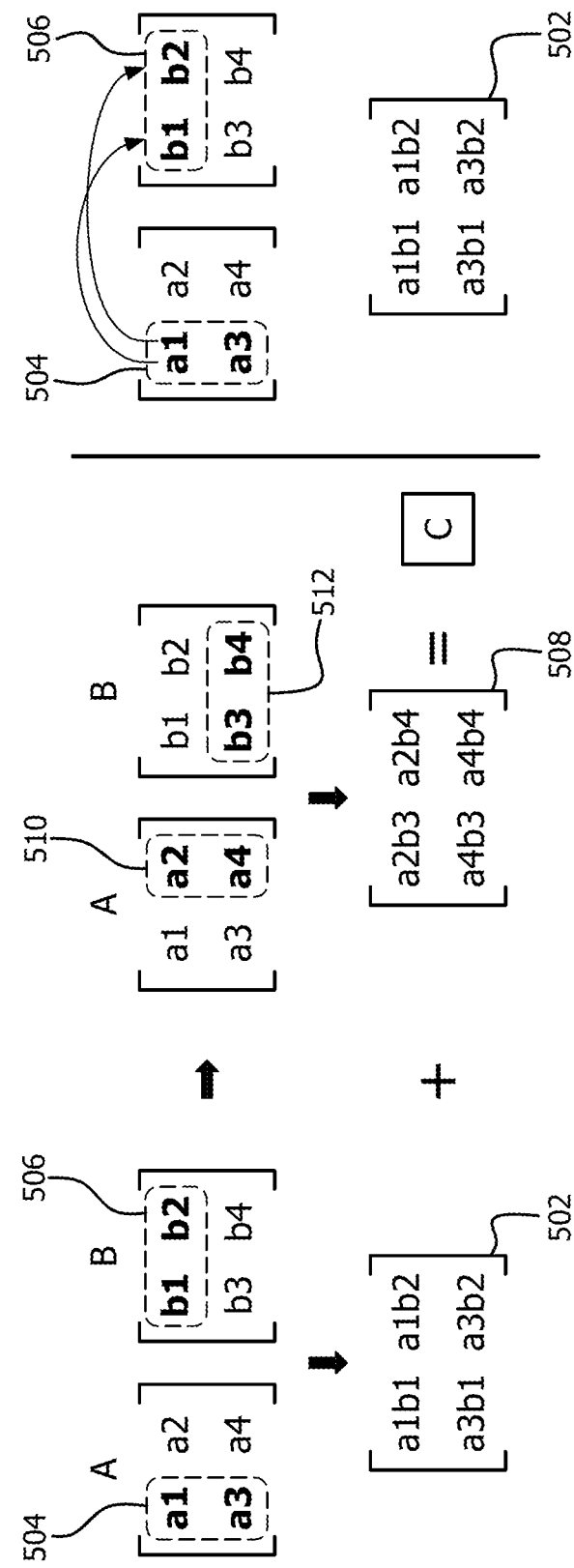
FIG. 5 illustrates an example of matrix multiplication as a sum of partial outer products of two matrices.

FIG. 5 illustrates an example of matrix multiplication as a sum of partial outer products of two matrices. For simplification, matrix A and matrix B shown in FIG. 5 each include 2 rows and 2 columns. Partial outer products are determined for each column of matrix A and each corresponding row of matrix B. For example, as shown on the left side of FIG. 5, an outer product 502 is determined for column 504 of matrix A and row 506 of matrix B and an outer product 508 is determined for column 510 of matrix A and row 512 of matrix B. The output matrix C is the sum of the partial outer products 502 and 508.

For each partial product 502 and 508, each element in a column of matrix A is multiplied by each element in a row of matrix B. For example, as shown on the right side of FIG. 5, element a1 of column 504 is multiplied by element b1 of row 506 of matrix B (a1b1). Element a1 of column 504 is also multiplied by element b2 of row 506 of matrix B (a1b2). Likewise, element a3 of column 504 is multiplied by element b1 of row 506 of matrix B (a3b1) and is also multiplied by element b2 of row 506 of matrix B (a3b2). That is, element a1 is reused to determine the partial product 502. That is, as can be seen in FIG. 5, each element a1, a3, b1 and b2 is reused to determine the partial product 502.

Features of the present disclosure exploit the reuse of elements present in the partial outer product algorithm to perform efficient matrix multiplication operations. For example, as described in more detail below, for each partial outer product computation, each CU 302 of a CU group (e.g., super CU 404) reads, from memory, and stores (e.g., loads to registers associated with a CU 302) a portion (e.g., one or more columns of data) of matrix A (or alternatively, a portion (e.g., one or more rows of data) of matrix B) and a portion (e.g., one or more rows of data) of matrix B (or alternatively, a portion (e.g., one or more columns of data) of matrix A). The portions of matrix B (or alternatively, the portions of matrix A) are then communicated among the CUs 302 while the portions of matrix A (or alternatively, the portions of matrix B) remain stationary (e.g., remain in the CU 302 that originally stored (e.g., loaded to registers) the portions).

In the examples described herein, memory includes a memory portion (e.g., memory 104) shared by each of the processor cores (e.g., CUs 302) as well as memory segments (e.g., registers, cache memory or other data holding elements), separate from the shared memory 104 (e.g., main memory). Each CU 302 is associated with a memory segment (e.g., registers, cache memory or other data holding elements) separate from the shared memory 104, which are, for example, implemented within each CU 302. Each CU 302 accesses the data in its associated memory segment more efficiently than the data in the shared memory 104. The data, previously been read from the shared memory 104 and stored (e.g., loaded into registers), is communicated among the CUs 302 without re-accessing (e.g., re-reading) the data from memory 104, reducing demands on the shared memory 104.

Features of the present disclosure also exploit characteristics of hierarchical CU networks, such as different physical proximities between subsets of CUs in hierarchical networks. For example, as described in more detail below, features of the present disclosure utilize asymmetric communication links (e.g., communication links H0, H1 and H2 shown in FIG. 4) in hierarchical CU network 400 and localize communication of data among CUs 302 of a local CU group (i.e., super CU 404) using, for example, the communication links H0 shown in FIG. 4.

Figure 6:
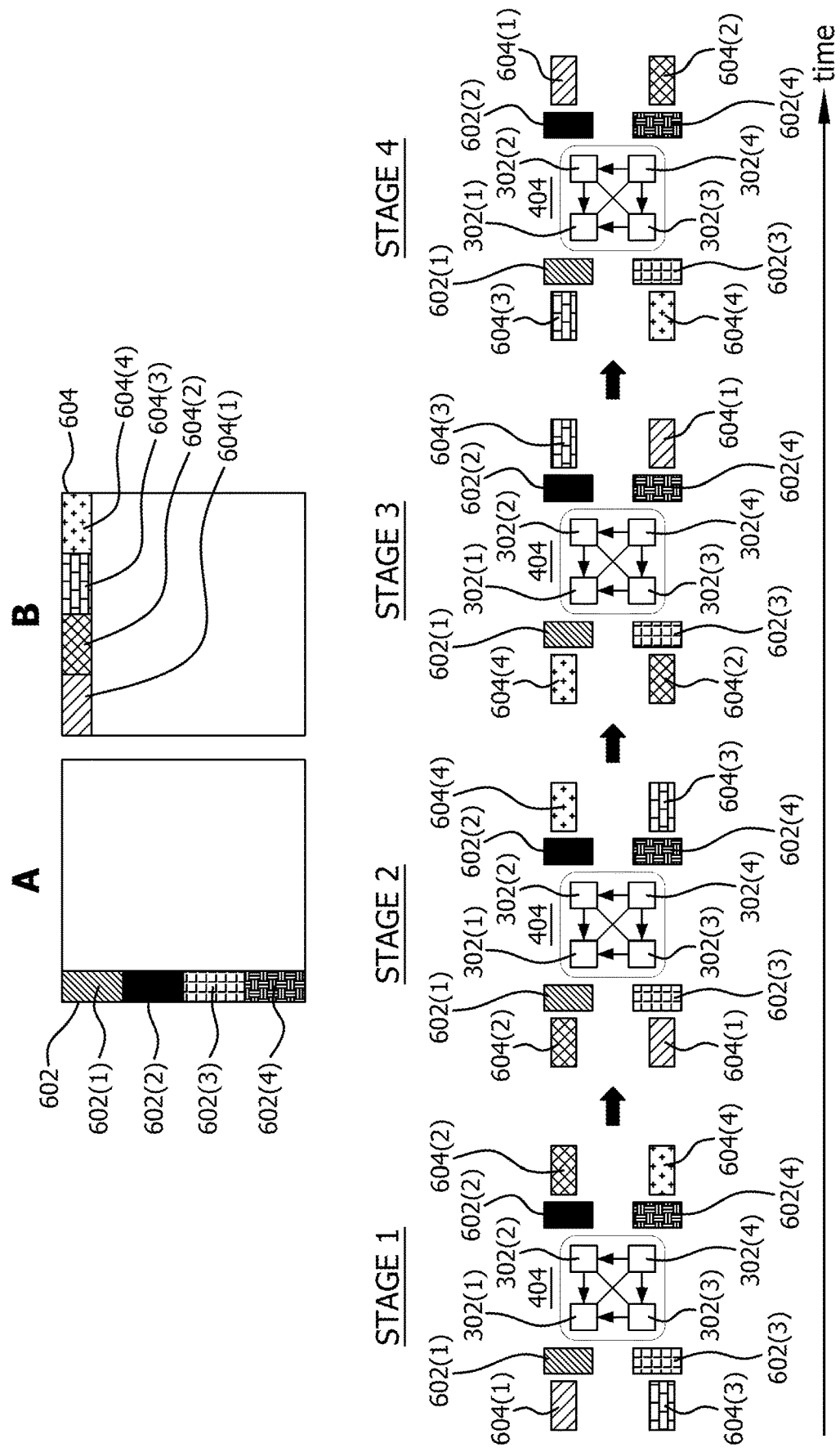
FIG. 6 is a diagram illustrating an example matrix multiplication computation of two matrices as a sum of partial outer products according to features of the disclosure.

FIG. 6 is a diagram illustrating matrix multiplication of two matrices, matrix A and matrix B, as a sum of partial outer products, according to features of the present disclosure. In outer product formulation, each element in a column of a first matrix interacts with each element in a row of a second matrix. As described herein, CUs 302 store (e.g., load to registers) portions (e.g., one or more columns or portions thereof) of matrix A (i.e., a first matrix) and portions (e.g., one or more rows or portions thereof) of matrix B (i.e., a second matrix). CUs 302 first determine outer products from portions of matrix A and the portions of matrix B and then communicate the portions of matrix B among other CUs 302 to complete a partial computation.

Matrix A and matrix B are illustrated at the top of FIG. 6. The sizes (i.e., number of columns and rows) of matrix A and matrix B are merely examples of matrix sizes. Matrix multiplication is performed, according to features of the present disclosure, for matrices of any size.

For simplified explanation, FIG. 6 illustrates a partial computation of the multiplication of matrix A and matrix B. That is, FIG. 6 illustrates a matrix multiplication computation of a portion 602, which includes 4 sub-portions 602(1)-602(4) of matrix A and a portion 604 of matrix B, which includes 4 sub-portions 604(1)-604(4). Portion 602 includes, for example, data from one or more columns of matrix A in which each of the 4 sub-portions 602(1)-602(4) is for example, a sub-portion of one or more columns and portion 604 includes data from one or more rows of matrix B in which each of the 4 sub-portions 604(1)-604(4) is, for example, a sub-portion of one or more rows of matrix B.

In various alternatives, any column of matrix A is partitioned to CUs of a single super CU 404 or across multiple super-CUs. For example, if matrix A does not include a sufficient number of columns for each CU 302, a single column is segmented and various segments of the column are distributed to multiple super CUs 404.

In the example shown in FIG. 6, the matrix multiplication computation is illustrated over 4 stages using one of the super CUs 404 of a super CU cluster 402 shown in FIG. 4. Examples of performing matrix multiplication according to features of the present disclosure also include using CU networks configured differently than network 400 in FIG. 4 (e.g., CU networks having different numbers of CUs, super CUs, CU clusters, and hierarchical levels than network 400 in FIG. 4).

As shown in stage 1 of FIG. 6, each CU 302(1)-302(4) of the super-CU 404 stores (e.g., reads from main memory and loads to a memory segment, such as registers, associated with each CU 302) a sub-portion portion 602(1)-602(4) of portion 602 of matrix A. Also in stage 1, each CU 302(1)-302(4) of the super-CU 404 stores (e.g., reads from main memory and loads to the memory segment) a different sub-portion 604(1)-604(4) of matrix B. For example, in stage 1, CU 302(1) stores (e.g., loads to registers associated with CU 302(1)) sub-portion 604(1), CU 302(2) stores (e.g., loads to registers associated with CU 302(2)) sub-portion 604(2), CU 302(3) stores (e.g., loads to registers associated with CU 302(3)) sub-portion 604(3) and CU 302(4) stores (e.g., loads to registers associated with CU 302(4)) sub-portion 604(4).

As shown in the remaining stages 2-4, the communication of the sub-portions 604(1)-604(4) of portion 604 of matrix B are rotated among the CUs 302 of the super CU 404 while sub-portions 602(1)-602(4) of portion 602 of matrix A remain stationary (i.e., remain in the same address of main memory associated with a CU 302). That is, at each stage of the partial computation, while sub-portions 602(1)-602(4) of portion 602 of matrix A remain stationary, each one of the sub-portions 604(1)-604(4) of matrix B is communicated by a CU 302 to another CU 302 until the sub-portions 604(1)-604(4) are communicated to each CU 302 of the super CU 404. Accordingly, each CU 302 accesses main memory a single time (i.e., in stage 1) and reuses each sub-portion 602(1) and 602(4) in stages 2-4, reducing demands on the memory shared by each of the CUs 302.

In the remaining stages 2-4, each sub-portion 604(1)-604(4) of matrix B is communicated from a CU 302 to another CU 302 of the super CU 404 without accessing main memory. For example, sub-portion 604(1) of portion 604 of matrix B, which is read from main memory and stored (e.g., loaded) to a memory segment (e.g., registers) separate from the main memory and associated with by CU 302(1) in stage 1, is communicated from CU 302(1) to CU 302(3). In stage 2, CU 302(3) stores (e.g., loads to registers) the received sub-portion 604(1) without accessing main memory.

Sub-portion 604(2) of portion 604 of matrix B, which is stored by CU 302(2) in stage 1, is communicated from CU 302(2) to CU 302(1). In stage 2, CU 302(1) stores (e.g., loads to registers) the received sub-portion 604(2) without accessing main memory.

Sub-portion 604(3) of portion 604 of matrix B, which is stored by CU 302(3) in stage 1, is communicated from CU 302(3) to CU 302(4). In stage 2, CU 302(4) stores (e.g., loads to registers) the received sub-portion 604(3) without accessing main memory.

Sub-portion 604(4) of portion 604 of matrix B, which is stored by CU 302(4) in stage 1, is communicated from CU 302(4) to CU 302(2). In stage 2, CU 302(2) stores (e.g., loads to registers) the received sub-portion 604(4) without accessing main memory.

As shown in stages 3 and 4 of FIG. 6, the sub-portions 604(1)-604(4) of matrix B are communicated, in a counter clockwise direction, from one CU 302 to another CU 302 of the super CU 404 in the same manner as described above with regard to stages 1 and 2 until each CU 302 of the super CU 404 has received each sub-portion 604(1)-604(4). The counter clockwise direction of the communication of the sub-portions 604(1)-604(4) shown in FIG. 6 is merely an example. Examples also include communicating the sub-portions 604(1)-604(4) in any direction using any of the communication links H0, such as communicating the sub-portions 604(1)-604(4) between CUs 302 in a clockwise direction and communicating the sub-the portions 604(1)-604(4) between CUs 302 in a diagonal direction.

The sizes of the matrices (e.g., number of rows and columns) shown in FIG. 6 are merely examples. The matrix multiplication computations for each of the remaining portions (i.e., columns of matrix A and rows of matrix B) are also performed in the same manner as the matrix multiplication computation of portions 602 and 604 shown in FIG. 6 to complete the matrix multiplication operation. For example, each one of the remaining columns of Matrix A is multiplied by a corresponding one of the remaining rows of matrix B, over 4 stages as shown in FIG. 6, using one or more of the 3 remaining super CUs 404 of a super SU cluster 402 shown in FIG. 6.

In the example described above with regard to FIG. 6, matrix multiplication is performed with sub-portions 602(1)-602(4) of portion 602 of matrix A remaining in main memory while communally storing (e.g., loading to registers) sub-portions 604(1)-604(4) of portion 604 of matrix B between CUs 302 within a super-CU 404. Alternatively, matrix multiplication is performed with sub-portions of matrix B remaining in main memory while communally storing (e.g., loading to registers) sub-portions of matrix A among CUs 302.

When a sufficient amount of local memory within a super-CU is not available to store a portion (e.g., one or more columns) of matrix A, the computation is performed, for example, by gradually storing (e.g., reading from main memory loading to registers) the corresponding portion of matrix B multiple times. Alternatively, the computation is performed, for example, by spreading a portion (e.g., one or more columns) of matrix A across multiple super-CUs and communally loading a single portion (e.g., one or more rows) of matrix B. Accordingly, each super-CU stores a portion of matrix B or stores sub-portions of the portion across super-CUs and exchanges segments of matrix B among the CUs.

FIG. 7 is a flow diagram illustrating an example of a matrix multiplication method 700 as sum of partial outer products according to features of the disclosure. As shown at block 702, the method 700 includes receiving (e.g., reading from memory) a sub-portion of a first matrix and a sub-portion of a second matrix. For example, each of the CUs 302 shown at stage 1 receive a sub-portion of one or more columns of matrix A and a sub-portion of one or more rows of matrix B. That is, initially, the sub-portions of matrix A and matrix B are, for example, received directly from memory (i.e., read from memory and not received from another CU 302). For example, sub-portion 602(1) of matrix A and sub-portion 604(1) of matrix B are initially read, by CU 302(1) directly from memory (e.g., cache memory of main memory).

As shown at block 704, the method 700 includes storing (e.g., loading to registers) the sub-portion of the first matrix and the sub-portion of the second matrix. That is, after the sub-portions are read from memory, each of the CUs 302 stores the portion of a first matrix and a sub-portion of a second matrix. For example, sub-portion 602(1) of portion 602 of matrix A (i.e., first matrix sub-portion) and sub-portion 604(1) of portion 604 of matrix B (i.e., second matrix sub-portion) are stored (e.g., loaded to a memory segment, such as registers associated with CU 302(1)) at stage 1. A partial outer product is then determined from the first matrix sub-portion 602(1) and the second matrix sub-portion 604(1), as shown in block 706.

The second matrix sub-portion is then communicated (i.e., by one CU 302 to another CU 302) while the first matrix sub-portion of the first matrix is maintained in memory (i.e., maintained in the associated memory segment and not communicated to another core), as shown at block 708 of the method 700. For example, as shown at stages 1 and 2 in FIG. 6, the second matrix sub-portion 604(1), used by CU 302(1) in stage 1, is communicated to CU 302(3) while the sub-portion 604(1) is maintained in memory (i.e., maintained in the memory segment associated with CU 302(1) and not communicated to CU 302(3)). The second matrix sub-portion 604(1) is received by CU 302(3), which is then used by CU 302(3) to determine another partial outer product, in stage 2, from the second matrix sub-portion 604(1) and another first matrix sub-portion 602(3) which was maintained in the memory segment associated with CU 302(3).

At decision block 710 it is determined whether a new second matrix sub-portion is received from another processor core. When it is determined, at decision block 710 that a new second matrix sub-portion is received, the outer product is determined (e.g., by the receiving CU). For example, CU 302(1) determines an outer product from newly received (i.e., received from CU 302(2)) second matrix sub-portion 604(2) and first matrix sub-portion 602(1) in stage 2 of FIG. 6 the new second matrix sub-portion 604(2) communicated by CU 302(2) is, for example, stored in a memory segment associated with CU 302(1). As further shown in stage 2, CU 302(1) uses the same sub-portion 602(1) of matrix A in stage 1 and stage 2 (and likewise in stages 3 and 4). That is, sub-portion 602(1) of matrix A is maintained in memory throughout each of stages 1-4.

When it is determined, at decision block 710 that a new second matrix sub-portion is not received (e.g., each second matrix sub-portion has been received used to determine the partial outer products), the partial computation of the matrix multiplication operation ends at block 712. For example, after each stage shown in FIG. 6 is completed, each CU 302(1)-302(4) determines that a new second matrix sub-portion is not received and the partial computation of the matrix multiplication operation ends.

Using outer products causes each outer product to scatter in an output matrix C. An outer product between a single column of A and row of B contributes to each element in an output matrix, resulting in some cases, in CUs of multiple super-CUs simultaneously outputting contributions to the same matrix. Features of the present disclosure employ atomic updates to memory, reducing the overall memory traffic. Super-CUs also, for example, communicate C blocks with each other over the H1 links and accumulate C blocks locally, reducing the atomic updates to memory. While this technique does not provide the benefits of localized communication via the H0 links, this technique avoids communication over H2 links, which occurs in conventional techniques.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device comprising:
   memory configured to store data; and
   a processor comprising a plurality of processor cores which share the memory and are in communication with each other via first hierarchical communication links and second hierarchical communication links, each processor core in a group of processor cores being in communication with each other via the first hierarchical communication links and associated with a memory segment separate from the shared memory, and each processor core in the group of processor cores configured to:
      store, in an associated memory segment separate from the shared memory, one of a plurality of sub-portions of data of a first matrix;
      store, in the associated memory segment separate from the shared memory, one of a plurality of sub-portions of data of a second matrix;
      determine an outer product of the sub-portion of data of the first matrix and the sub-portion of data of the second matrix;
      receive, from another processor core of the group, another sub-portion of data of the second matrix;
      store the other sub-portion of data of the second matrix in the associated memory segment that is separate from the shared memory; and
      determine another outer product of the sub-portion of data of the first matrix and the other sub-portion of data of the second matrix.

2. The processing device according to claim 1, wherein each of the plurality of processor cores is a compute unit comprising one or more single instruction, multiple data (SIMD) units.

3. The processing device according to claim 1, wherein the group of processor cores is one of a plurality of first hierarchical groups of processor cores;
   the plurality of processor cores comprises a second hierarchical group of processor cores comprising the plurality of first hierarchical groups, the first hierarchical groups being in communication with each other via a plurality of second communication links,
   each one of the first communication links extends a first distance, each one of the second communication links extends a second distance and the first distance is less than the second distance, and
   the other sub-portion of data of the second matrix is received from the other processor core via one of the first communication links.

4. The processing device according to claim 3, wherein the sub-portions of data of the first matrix are sub-portions of one or more columns of the first matrix; and
   the sub-portions of data of the second matrix are sub-portions of one or more rows of the second matrix.

5. The processing device according to claim 1, wherein each processor core is further configured to determine a partial outer product from the sub-portions of data of the first matrix and the sub-portions of data of the second matrix, and
   the processor is configured to determine a third matrix from a sum of each partial outer product.

6. The processing device according to claim 1, wherein each processor core is further configured to receive the other sub-portion of data of the second matrix from the other processor core without accessing the memory.

7. A processing device comprising:
   memory configured to store data; and
   a first plurality of processor cores which share the memory and are in communication with each other via first hierarchical communication links, the first plurality of processor cores comprising a first processor core and a second processor core each associated with a memory segment separate from the shared memory, wherein
   the first processor core is configured to:
      determine an outer product of a first sub-portion of data of a first matrix, which is stored in a first memory segment separate from the shared memory and associated with the first processor core, and a first sub-portion of data of a second matrix, which is stored in the first memory segment separate from the shared memory and associated with the first processor core; and
      communicate, to the second processor core, via one of the first hierarchical communication links, the first sub-portion of data of the second matrix without communicating the first sub-portion of data of the first matrix to the second processor core; and
   the second processor core is configured to:
      receive the first sub-portion of data of the second matrix, communicated from the first processor core, without accessing the shared memory;
      store the first sub-portion of data of the second matrix in a second memory segment separate from the shared memory and associated with the second processor core; and
      determine another outer product of the first sub-portion of data of the second matrix received from the first processor core and a second sub-portion of data of the first matrix received from the memory.

8. The processing device according to claim 7, wherein the first processor core is configured to determine the outer product and communicate the first sub-portion of data of the second matrix at a first stage; and
   the second processor core is configured to receive the first sub-portion of data of the second matrix and determine the other outer product at a second stage after the first stage.

9. The processing device according to claim 7, wherein the first processor core is further configured to:
- communicate the first sub-portion of data of the second matrix to the second processor core while the first sub-portion of data of the first matrix remains in the memory segment associated with the first processor core; and
- the second processor core is further configured to communicate, to a third processor core via one of the first hierarchical communication links, the first sub-portion of data of the second matrix while the second sub-portion of data of the first matrix remains in a memory segment, separate from the memory, associated with the second processor core.

10. The processing device according to claim 7, wherein each of the plurality of processor cores is a compute unit comprising one or more single instruction, multiple data (SIMD) units.

11. The processing device according to claim 7, wherein
- the plurality of processor cores is one of a plurality of first hierarchical groups of processor cores, each processor core of a first hierarchical group being in communication with each other via a plurality of the first communication links; and
- the processing device further comprises a second hierarchical group of processor cores comprising the first hierarchical groups of processor cores, the first hierarchical groups being in communication with each other via a plurality of second communication links,
- wherein each one of the first communication links extends a first distance, each one of the second communication links extends a second distance and the first distance is less than the second distance, and
- the first sub-portion of data of the second matrix is communicated by the first processor core to the second processor core via one of the first communication links.

12. The processing device according to claim 7, wherein
- the first processor core is configured to receive remaining sub-portions of data of the second matrix from other processor cores of the plurality of processor cores and determine outer products for the remaining sub-portions of data of the second matrix and the first sub-portion of data of the first matrix while the first sub-portion of data of the first matrix remains in the memory segment, separate from the memory, associated with the first processor core, and
- the second processor core is configured to receive the remaining sub-portions of data of the second matrix from the other processor cores of the plurality of processor cores and determine outer products for the remaining sub-portions of data of the second matrix and the second sub-portion of data of the first matrix while the second sub-portion of data of the first matrix remains in the memory segment, separate from the memory, associated with the second processor core.

13. The processing device according to claim 7, wherein
- the first sub-portion of data of the first matrix is a sub-portion of one or more columns of the first matrix; and
- the first sub-portion of data of the second matrix is a sub-portion of one or more rows of the second matrix.

14. A method for use in a processing device having a plurality of processor cores, which share a memory and communicate with each other via first hierarchical communication links for performing matrix multiplication as a sum of partial outer products, the method comprising:
- receiving, from the shared memory by a first processor core, a first sub-portion of data of a first matrix;
- receiving, from the shared memory by the first processor core, a first sub-portion of data of a second matrix;
- determining, by the first processor core, an outer product of the first sub-portion of data of the first matrix, which is stored in a first memory segment separate from the shared memory and associated with the first processor core and the first sub-portion of data of the second matrix, which is stored in the first memory segment separate from the shared memory and associated with the first processor core;
- communicating, by the first processor core to a second processor core, the first sub-portion of data of the second matrix via one of the first hierarchical communication links;
- receiving, from the shared memory by the second processor core, a second sub-portion of data of the first matrix;
- storing the first sub-portion of data of the second matrix in a second memory segment separate from the shared memory and associated with the second processor core; and
- determining, by the second processor core, another outer product of the second sub-portion of data of the first matrix received from memory and the first sub-portion of data of the second matrix communicated by the first processor core.

15. The method according to claim 14, further comprising communicating, by the first processor core, the first sub-portion of data of the second matrix to the second processor core without accessing the memory.

16. The method according to claim 14, further comprising communicating, by the second processor core, the first sub-portion of data of the second matrix to a third processor core.

17. The method according to claim 14, further comprising:
- determining, by the first processor core, outer products for the first sub-portion of data of the first matrix and remaining sub-portions of data of the second matrix by receiving each remaining sub-portion of data of the second matrix from other processor cores via the plurality of first hierarchical communication links while the first sub-portion of data of the first matrix remains in the memory segment separate from the memory and associated with the first processor core, and
- determining, by the second processor core, outer products for the second sub-portion of data of the first matrix and the remaining sub-portions of data of the second matrix by receiving each remaining sub-portion of data of the second matrix from other processor cores via the plurality of first hierarchical communication links while the second sub-portion of data of the first matrix remains in the memory segment associated with the second processor core.

18. The method according to claim 14, wherein
- the first sub-portion of data of the first matrix is a sub-portion of one or more columns of the first matrix, and
- the first sub-portion of data of the second matrix is a sub-portion of one or more rows of the second matrix.

19. The method according to claim 14, wherein the first processor core and the second processor core are cores of a first group of processor cores, the processor cores of the first group being in communication with each other via the plurality of first hierarchical communication links; and the first group of processor cores is in communication with a second group of processor cores via one of a plurality of second hierarchical communication links, wherein each one of the first hierarchical communication links extends a first distance, each one of the second communication hierarchical links extends a second distance and the first distance is less than the second distance.

\* \* \* \* \*